(12) United States Patent
Fiesel

(10) Patent No.: US 7,468,761 B1
(45) Date of Patent: Dec. 23, 2008

(54) FREQUENCY CONVERTER FOR A TELEVISION SIGNAL

(75) Inventor: Hans Fiesel, Glottertal (DE)

(73) Assignee: Micronas Intermetall GmbH, Freiburg (DE)

( * ) Notice: Subject to any disclaimer, the term of this patent is extended or adjusted under 35 U.S.C. 154(b) by 0 days.

(21) Appl. No.: 09/325,930

(22) Filed: Jun. 4, 1999

(30) Foreign Application Priority Data

Jun. 6, 1998 (DE) .............................. 198 25 455

(51) Int. Cl.
H04N 5/44 (2006.01)
H04B 1/04 (2006.01)
H04B 1/10 (2006.01)

(52) U.S. Cl. .................. 348/725; 375/350; 455/130

(58) Field of Classification Search ......... 348/725–729, 348/732, 735, 731; 455/130, 131, 255, 256–259; 334/13, 16, 26; 331/15, 16, 20, 47, 57; 375/232, 375/229, 350

See application file for complete search history.

(56) References Cited

U.S. PATENT DOCUMENTS 4,860,018 A * 8/1989 Counselman, III ..... 342/357.12
5,321,514 A * 6/1994 Martinez .................... 348/723
5,507,024 A * 4/1996 Richards, Jr. ............... 455/260
5,572,264 A 11/1996 Mizukami et al. .......... 348/735
5,748,262 A * 5/1998 Boie ........................... 348/726
5,831,689 A * 11/1998 Boie ........................... 348/725
5,893,025 A * 4/1999 Bessho et al. ............... 725/151

FOREIGN PATENT DOCUMENTS

EP 0 065 150 A 11/1982
EP 0 696 854 A 2/1996
EP 0 813 345 A2 12/1997

* cited by examiner

Primary Examiner—Paulos M Natnael
(74) Attorney, Agent, or Firm—Duane Morris LLP

(57) ABSTRACT

A frequency converter for converting an intermediate-frequency television signal (s2) to a low frequency by means of a mixer (4) which is fed at its radio-frequency signal input (4.1) with the intermediate-frequency television signal (s2) via an intermediate-frequency filter (3) and at its local-oscillator-signal input (4.2) with a local-oscillator signal (u), the frequency of the local-oscillator signal (u) lying in the range of an adjacent picture carrier (NBT) which is defined by the channel spacing ($k_0$; $k_0^*$) and the respective television standard, and which after the frequency conversion is suppressed as a converted adjacent picture carrier (NBT*), or at least attenuated to a negligible residual amplitude, by means of a high-pass selectivity skirt (HP) of a filter device (5).

14 Claims, 1 Drawing Sheet

FREQUENCY CONVERTER FOR A TELEVISION SIGNAL

FIELD OF INVENTION

The present invention relates to a frequency converter for processing television signals in the intermediate-frequency band for television sets, video recorders, PC cards, or set-top boxes for, e.g., satellite or cable reception, and further multimedia applications.

BACKGROUND OF THE INVENTION

Television signals to be processed are, as a rule, assigned to different standards. They differ in the frequency separation and the levels of the picture carrier and the chrominance subcarrier. During transmission, the channel spacing may differ, too. In multistandard equipment or if quasi-split-sound processing is performed, this requires different surface-wave filters (SWFs) in the intermediate-frequency range for channel separation or, in the case of split-sound processing, for separating the video and sound information in the respective channel. If the respective surface-wave filters are not exactly designed for the respective television standard and the respective transmission standard, and the selectivity skirt in the range of the adjacent picture carrier, the relatively high picture-carrier amplitude of the adjacent channel may show up as an interference signal both in the two sound carrier channels of the current television channel and in the picture. If the interfering picture carrier amplitude is large enough, it enters as a disturbance variable into the large-signal behavior of subsequent stages. In that case, the unavoidable non-linearity of a subsequent analog-to-digital converter is no longer negligible for the signal processing. Furthermore, the resolution of the analog-to-digital converter decreases since an essential portion of the available dynamic range is occupied by the signal amplitude of the adjacent picture carrier, whereby the number of quantization levels available for the desired signal is reduced.

Surface-wave filters, which, as a rule, cannot be fabricated together with monolithic integrated circuits, represent separate components which increase the amount of external circuitry and the components count, particularly in multistandard equipment.

It is an object of the invention to reduce the additional external circuit complexity caused by the use of surface-wave filters, particularly in multistandard equipment, to a minimum.

SUMMARY OF INVENTION

A frequency converter for converting an intermediate-frequency television signal (s2) to a low frequency by means of a mixer (4) which is fed at its radio-frequency signal input (4.1) with the intermediate-frequency television signal (s2) via an intermediate-frequency filter (3) and at its local-oscillator-signal input (4.2) with a local-oscillator signal (u), the frequency of the local-oscillator signal (u) lying in the range of an adjacent picture carrier (NBT) which is defined by a channel spacing ($k_0$; $k_0^*$) and a respective television standard, and which after the frequency conversion is suppressed as a converted adjacent picture carrier (NBT*), or at least attenuated to a negligible residual amplitude, by means of a high-pass selectivity skirt (HP) of a filter device (5).

DETAILED DESCRIPTION OF THE INVENTION

Figure 1:
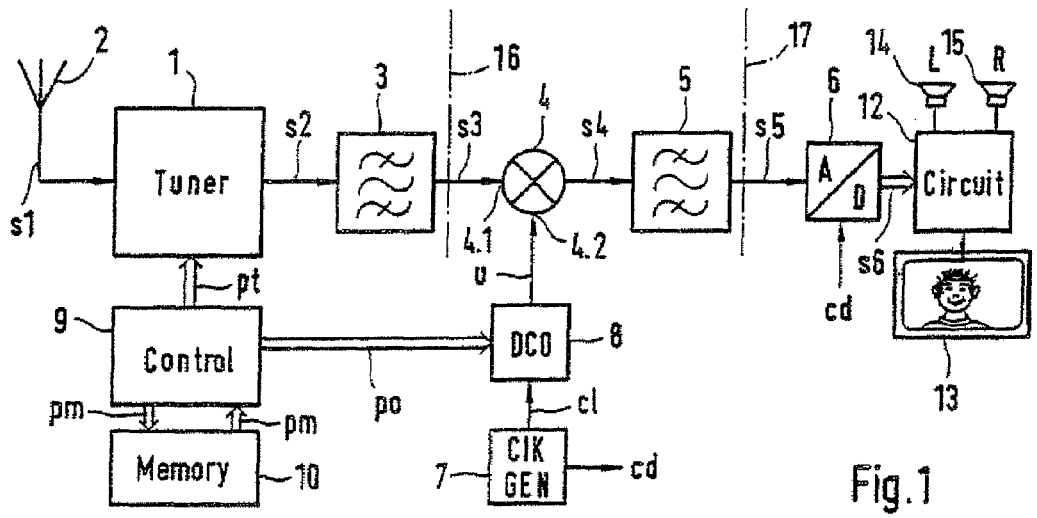
FIG. 1 illustrates a block diagram of a preferred embodiment of the frequency converter according to the invention which is particularly suited for multistandard operation.

This object is attained essentially by the use of a universal intermediate-frequency filter whose bandwidth is sufficiently great for all television and transmission standards. As a result, part of the interfering adjacent picture carrier may still be present in the desired television channel. The interfering adjacent picture carrier is subsequently converted by suitable frequency conversion of the entire universal intermediate frequency filter output signal to a low frequency band, where it is either completely eliminated by means of an analog high-pass filter or at least reduced to the point that it cannot interfere with the subsequent signal processing.

The second frequency conversion of the intermediate-frequency signal is performed by an analog frequency converter which converts the entire television signal to a low frequency by means of a mixer. For the local-oscillator signal, a frequency is chosen which is identical with the frequency of the interfering adjacent picture carrier or at least is located in the vicinity thereof, so that after the frequency conversion, the interfering adjacent picture carrier is located near the frequency origin and can be removed from the television signal or at least be sufficiently attenuated by means of a high-pass selectivity skirt of an analog filter device.

The second frequency conversion has an added advantage in that the signal frequencies to be processed are very low, which is favorable for the subsequent digital processing. The local conversion of the adjacent picture carrier, which is located at approximately 30 MHZ, places no increased requirements on the mixer, which can be operated with a quantized local-oscillator signal, in the simplest case a square-wave signal, because the first produced harmonic of the mixing process is located at approximately 60 MHZ, while after the second frequency conversion the desired-signal components of the current television channel extend only to approximately 10 MHZ. Thus it is readily possible to suppress these and higher harmonics using a suitable low-pass filter, which may form part of the analog filter device mentioned above. Hence, advantages are gained by the second frequency conversion even without the use of a universal intermediate-frequency filter and without the requirement of multistandard operation.

The local-oscillator signal may differ in frequency from the interfering adjacent picture carrier, but this frequency offset must be sufficiently small compared to the cutoff frequency of the high-pass filter, so that the selectivity skirt of the latter can sufficiently reduce the adjacent picture carrier in amplitude. In multistandard equipment, the local oscillator coupled to the mixer is a frequency-controlled oscillator (VCO or DCO) with an associated control unit. Advantageously, the frequency is set at a predetermined value by means of a phase-locked loop (PLL). Whether the oscillator is designed as a ring oscillator, a digitally controlled oscillator, an RC oscillator, or a sawtooth oscillator with an integrating stage depends on the required accuracy and on the available circuit technology. If the processing after the analog filter device is digital, a crystal-stabilized system clock will generally be present, which then serves as a frequency reference for the PLL.

The invention and further advantageous features thereof will now be explained in greater detail with reference to the accompanying drawings, in which the block diagram of FIG. 1 shows the frequency converter according to the invention in a typical application with preceding and succeeding circuit elements which correspond, for example, to a television receiver with digital signal processing. A tuner receives a radio-frequency television signal s1 via an antenna 2, converts it to an intermediate frequency, and feeds its output as a television signal s2 to a universal intermediate-frequency filter 3. This intermediate-frequency filter 3 need not provide the high selectivity of conventional intermediate-frequency filters, but the invention allows the use of a less selective universal intermediate-frequency filter which can also be implemented with a surface-wave filter.

The output s3 of the intermediate-frequency filter 3 is fed to a mixer 4 followed by an analog filter device 5 with bandpass characteristics. The analog filter device 5 has a high-pass selectivity skirt HP located near the frequency origin. This skirt, however, provides relatively high attenuation already at the frequency of the converted adjacent picture carrier NBT*. Advantageously, the filter device 5 also has a low-pass characteristic for higher frequencies, because then the residues of the adjacent channels are attenuated or suppressed. Also suppressed are harmonics which are generated by nonlinearities of the mixer 4, particularly if the local-oscillator signal u is a square-wave signal with the values +1 and −1. In that case, the mixer 4 will only contain an analog inverting stage for the television signal s3 at the radio-frequency signal input 4.1. After the filter device 5, the interfering signal components are small enough, so that the desired television signal s5 can be separated into its components. This can be done using analog or digital circuitry. In the embodiment of FIG. 1, the television signal s5 at the low frequency is digitized by means of an analog-to-digital converter 6 and forms a data stream s6. The conversion clock cd comes from a system clock generator 7.

The analog-to-digital converter, which has a resolution of, e.g., 10 bits, is followed by a digital television-signal-processing circuit 12 which is coupled to a screen 13 and a pair of loudspeakers 14, 15 for picture and sound reproduction. The digital television-signal-processing circuit 12 includes the usual digital filter circuits, which are precisely tuned to the respective video and sound channels to permit exact signal separation and demodulation of the individual signal components.

The invention moves the selective circuitry from the external intermediate-frequency SWF toward the subsequent circuit, which is implemented, at least in essential parts, using monolithic integrated circuit technology. Suitable IC input interfaces 16, 17 are given in FIG. 1. If analog and digital functional units can be implemented together in the monolithic integrated circuit, the interface 16 will be of advantage. In that case, the RF signal input 4.1 of the mixer 4 will also form the IC signal input. If the resolution of the analog-to-digital converter 6 is high enough, the video and sound signals in the common data stream s6 can be separated in the signal processing circuit 12 purely digitally. Then, separate digitization of the previously separated video and sound signals by the conventional split-sound methods is not necessary.

The local-oscillator-signal input 4.2 of the mixer 4 is fed with the signal u from a local oscillator 8. If different frequencies are required for the local-oscillator signal u in multistandard equipment, the local oscillator 8 will be frequency-controllable and be incorporated in a PLL. The associated control signals po—digital control signals in FIG. 1—come from a control unit 9, e.g. a microprocessor, which also provides control signals pt for the tuner 1. The control information is retrieved as channel data pm from a memory 10 according to the channel to be selected and the associated television standard. For the local oscillator 8, in FIG. 1 a digitally controlled oscillator (DCO), the crystal-stabilized system clock cl represents the reference frequency, which is locked to the frequency of the respective local-oscillator signal u via the PPL.

Figure 2:
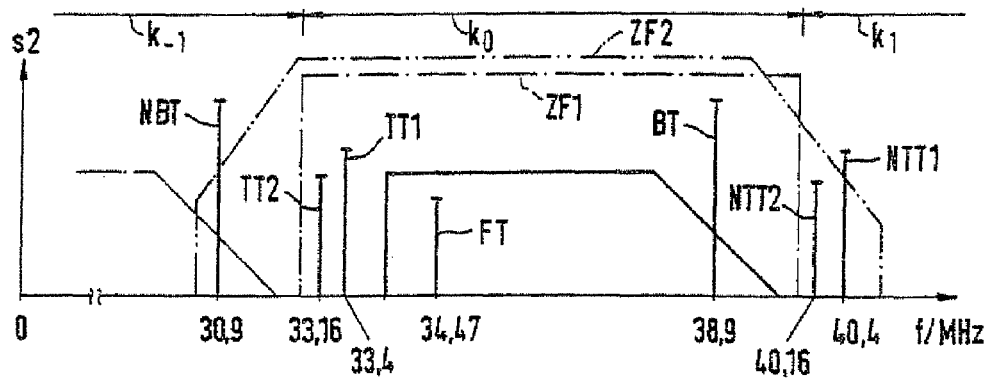
FIG. 2 illustrates the frequency scheme of a typical television signal at the intermediate frequency.

FIG. 2 shows schematically the typical signal spectrum at the output of the tuner 1 for a television signal s2 according to standard G at the intermediate frequency. The current channel $k_0$ extends from approximately 33 MHZ to 40 MHZ and contains the picture carrier BT at 38.9 MHZ, the chrominance subcarrier FT at 34.47 MHZ, the first sound carrier TT1 at 33.4 MHZ, and the second sound carrier TT2 at 33.16 MHZ. The adjacent picture carrier NBT of the next lower channel $k_{-1}$, which is located at 30.9 MHZ, i.e., in the vicinity of the two sound carriers TT1 and TT2, is critical for the sound channel processing. The response curve of an ideal intermediate-frequency filter ZF1, which covers only the signal components of the current channel $k_0$, is shown schematically in FIG. 2. The response curve ZF2 of the universal intermediate-frequency filter 3 is much less selective, as it covers parts of the adjacent picture carrier NBT of the next lower channel $k_{-1}$ and the first and second adjacent sound carriers NTT1, NTT2 of the next higher channel $k_1$. The influence of these adjacent sound carriers on picture reproduction is less critical than the influence of the adjacent picture carrier NBT on the current channel $k_0$. Reference is made to European Standard EN 55020 of 1994, "Störfestigkeit von Rundfunkempfängern und verwandten Geräten der Unterhaltungselektronik", which specifies that the interfering adjacent picture carrier NBT must exceed the picture carrier BT by even 3 dB. The bandwidth of the universal intermediate-frequency filter 3 or ZF2 is approximately 8 MHZ, so that the signal contents of all transmission standards (B/G, D/K, I, M/N, L/L') are passed. From the example of FIG. 2 it is apparent that the filter curve ZF2 attenuates undesired adjacent-channel components $k_1$, $k_{-1}$ insufficiently.

Figure 3:
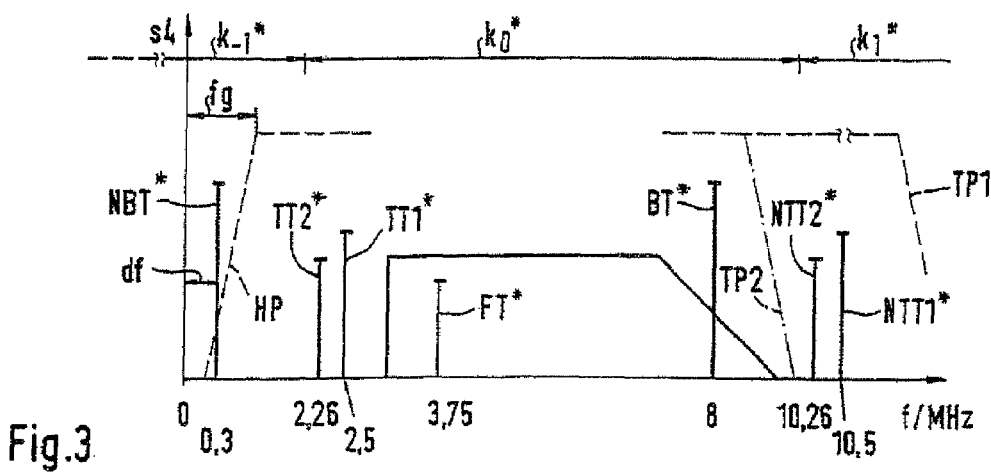
FIG. 3 illustrates the frequency scheme of the television signal of FIG. 2 at the low frequency following the second frequency conversion.

FIG. 3 shows the frequency spectrum of the television signal s4 after the second frequency conversion, which, as in the frequency scheme of FIG. 2, is performed with a local-oscillator signal u located as close to 30.9 MHZ as possible. In the example shown, the frequency offset df of the local-oscillator signal u from the adjacent picture carrier NBT is 300 kHz. The converted current television channel $k_0^*$ extends between approximately 2 MHZ and 10 MHZ. The interfering adjacent picture carrier NBT* is located at 300 kHz, corresponding to the 300-kHz frequency offset of the local-oscillator signal u, and can be largely suppressed by means of a high-pass selectivity skirt HP of low order, whose cutoff frequency fg in the example shown is 1 MHZ. The interfering harmonics at 60 MHZ can be suppressed by means of a low-pass selectivity skirt TP1 below 60 MHZ. It would be optimal if the low-pass selectivity skirt were located so low as to pass only the current channel $k_0^*$, cf. the ideal low-pass selectivity skirt TP2 shown in FIG. 3. This steep selectivity skirt TP2 is not necessary, however. It is essential that the low-pass selectivity skirt TP1 or TP2 does not yet attenuate the current channel $k_0^*$, particularly if the implementation of the Nyquist slope in the case of the picture carrier BT is reserved for subsequent stages.

Although the invention has been described in a preferred form with a certain degree of particularity, it is understood that the present disclosure of the preferred form has been made only by way of example, and that numerous changes in the details of construction and combination and arrangement of parts may be made without departing from the spirit and scope of the invention as hereinafter claimed. It is intended that the patent shall cover by suitable expression in the appended claims, whatever features of patentable novelty exist in the invention disclosed.

I claim:

1. A frequency converter for converting an intermediate-frequency television signal to a low frequency comprising:
    a mixer having a first and second inputs and an output;
    a first filter coupled to said first input of said mixer, said first filter processing an intermediate-frequency signal into an output signal comprising a selected channel and residues of upper and lower adjacent channels;
    an oscillator coupled to said second input of said mixer and adapted to provide an oscillator-signal (u) lying in a range of said lower adjacent channel; and
    a second filter coupled to said output of said mixer, said second filter having a high-pass selectivity skirt for attenuating said residues of said upper and lower adjacent channels to a negligible residual amplitude.

2. The frequency converter of claim 1, wherein a frequency offset (df) of the oscillator signal (u) from the lower adjacent channel is less than a high-pass cutoff frequency (fg) of the second filter.

3. The frequency converter of claim 2, wherein the mixer is fed at the second input with a quantized local-oscillator signal (u), and harmonics produced by the mixer are suppressed in a television signal by means of a low-pass selectivity skirt of the second filter.

4. The frequency converted of claim 3, wherein the local-oscillator signal (u) is a square-wave signal, having the values +1 and −1.

5. The frequency converter of claim 1, further comprising a control unit coupled to said oscillator, wherein the oscillator is digitally controlled by said control unit according to a respective television standard or respective channel spacing.

6. The frequency converter of claim 1, further comprising digitizing means coupled to said second filter, said digitizing means for digitizing a television signal for further signal processing by an analog-to-digital converter.

7. A method for processing an intermediate-frequency television signal comprising the steps of:
    filtering an intermediate-frequency signal with a first filter to provide a filtered intermediate-frequency signal comprising a selected channel and residues of upper and lower adjacent channels;
    generating an oscillator signal (u), the oscillator signal (u) lying in a range of said lower adjacent channel;
    mixing said filtered intermediate-frequency signal and said oscillator signal (u);
    filtering said mixed signals using a second filter having a high-pass selectivity skirt to attenuate said residues of said upper and lower adjacent channels to a negligible residual amplitude; and,
    separating said filtered mixed signals into visual and audible components for reproduction.

8. The method of claim 7, wherein said first filter comprises a surface-wave filter.

9. The method of claim 7, wherein a frequency offset (df) of the oscillator signal (u) from said lower adjacent channel is less than a high-pass cutoff frequency of the second filter.

10. The method of claim 9, wherein said oscillator signal (u) is quantized, and further comprising the step of suppressing harmonics produced by said mixing using the second filter.

11. The method of claim 10, wherein the oscillator signal u is a square-wave signal having values +1 and −1.

12. The method of claim 7, further comprising the step of digitizing said filtered mixed signals.

13. The method of claim 7, further comprising controlling said oscillator signal (u) with a control device, wherein said oscillator signal (u) is digitally controlled according to a respective television standard or respective channel spacing.

14. The method of claim 7, further comprising the step of feeding said oscillator signal (u) from a digitally controlled oscillator whose frequency is determined by control signals (po) from a control unit according to a respective television standard or respective channel spacing.

* * * * *